(12) United States Patent
Enright

(10) Patent No.: US 10,040,543 B2
(45) Date of Patent: Aug. 7, 2018

(54) TAPERED BRAKE DISK

(75) Inventor: John Joseph Enright, Troy, OH (US)

(73) Assignee: GOODRICH CORPORATION, Charlotte, NC (US)

( * ) Notice: Subject to any disclaimer, the term of this patent is extended or adjusted under 35 U.S.C. 154(b) by 2287 days.

(21) Appl. No.: 12/723,228

(22) Filed: Mar. 12, 2010

(65) Prior Publication Data
US 2011/0220763 A1  Sep. 15, 2011

(51) Int. Cl.
*F16D 55/36* (2006.01)
*B64C 25/44* (2006.01)
(Continued)

(52) U.S. Cl.
CPC .......... *B64C 25/44* (2013.01); *F16D 65/0006* (2013.01); *F16D 65/12* (2013.01); *F16D 2065/024* (2013.01); *F16D 2065/1368* (2013.01)

(58) Field of Classification Search
CPC ...... F16D 55/36; F16D 2123/00; F16D 65/18; F16D 65/186; F16D 2055/0091; F16D 2065/024
(Continued)

(56) References Cited

U.S. PATENT DOCUMENTS 1,859,280 A * 5/1932 Corbin, Jr. ................... 188/71.5
2,023,772 A * 12/1935 Russo ......................... 192/70.15
(Continued)

FOREIGN PATENT DOCUMENTS

GB 597870 2/1948
GB 602730 6/1948
(Continued)

OTHER PUBLICATIONS

FR; Office Action dated May 9, 2011 in Application No. 1059168.
(Continued)

*Primary Examiner* — Bradley T King
*Assistant Examiner* — Mahbubur Rashid
(74) *Attorney, Agent, or Firm* — Snell & Wilmer, L.L.P.

(57) ABSTRACT

A brake stack comprises a stator having an annular, inner periphery section disposed substantially along a first radial plane extending normal to an axis of a wheel, and a stator side wall having a first stator contact surface, the first stator contact surface including a sloped portion which deviates away from the radial plane defined by the annular, inner periphery section. The brake stack further comprises a rotor having an annular, outer periphery section disposed substantially along a second radial plane extending normal to the axis of the wheel, and a rotor side wall having a first rotor contact surface shaped complementary to the first stator contact surface, wherein the stator and the rotor are interleaved.

A brake disk may comprise a first radius of a friction surface at a first axial position and a second radius of the friction surface at a second axial position, where the first radius is different than the second radius. The brake disk may further comprise an axis of rotation orthogonal to a plane of rotation, wherein the brake disk rotates substantially in the plane of rotation, and wherein the friction surface is at an acute angle to the plane of rotation.

An aircraft brake system comprises an aircraft rotor oriented orthogonally with respect to an axis of rotation and an aircraft stator configured to nest with the aircraft rotor, where a stator friction surface is non-orthogonal to the axis of rotation. The aircraft brake system may further comprise a pressure plate and an end plate configured to nest with the aircraft rotor and/or aircraft stator, and an actuator may be utilized to effectuate braking of the aircraft braking system.

6 Claims, 5 Drawing Sheets

(51) Int. Cl.
*F16D 65/00* (2006.01)
*F16D 65/12* (2006.01)
*F16D 65/02* (2006.01)

(58) Field of Classification Search
USPC .................. 188/71.4, 71.5, 218 XL, 250 G;
192/66.2, 70.14, 70.15, 107 R
See application file for complete search history.

(56) References Cited

U.S. PATENT DOCUMENTS

| | | | | |
|---|---|---|---|---|
| 2,063,443 | A | * | 12/1936 | Lambert ...................... 188/71.7 |
| 2,174,240 | A | * | 9/1939 | Glenney ............... F16D 13/648 |
| | | | | 192/70.28 |
| 2,540,965 | A | * | 2/1951 | Schellinger ........... F16D 13/648 |
| | | | | 192/52.3 |
| 2,635,714 | A | * | 4/1953 | Butler .......................... 188/71.5 |
| 2,905,279 | A | * | 9/1959 | Moyer ..................... 188/218 XL |
| 2,987,143 | A | * | 6/1961 | Fuchs et al. ................. 188/71.5 |
| 3,578,119 | A | * | 5/1971 | Auriol ........................ 192/70.14 |
| 4,207,969 | A | * | 6/1980 | Howell .................. F16D 55/40 |
| | | | | 188/106 P |
| 4,299,311 | A | | 11/1981 | Shirai et al. |
| 4,802,564 | A | * | 2/1989 | Stodt ........................ F16D 13/52 |
| | | | | 188/71.5 |
| 4,804,071 | A | * | 2/1989 | Schultz et al. ............... 188/71.5 |
| 5,086,898 | A | * | 2/1992 | Patton et al. .............. 192/70.12 |
| 5,435,797 | A | * | 7/1995 | Harris ................... B60W 30/18 |
| | | | | 192/109 F |
| 6,491,138 | B1 | | 12/2002 | Spaegele |
| 2004/0200687 | A1 | * | 10/2004 | Rudolf ................. F16D 13/585 |
| | | | | 192/107 R |
| 2013/0248303 | A1 | * | 9/2013 | Okuno .................... B60T 1/062 |
| | | | | 188/67 |

FOREIGN PATENT DOCUMENTS

GB 665273 6/1952
JP 09025970 A * 1/1997

OTHER PUBLICATIONS

GB: Examination Report dated May 10, 2010 in Application No. GB1006635.5.

GB: Search Report dated Aug. 16, 2010 in Application No. GB1006635.5.

* cited by examiner

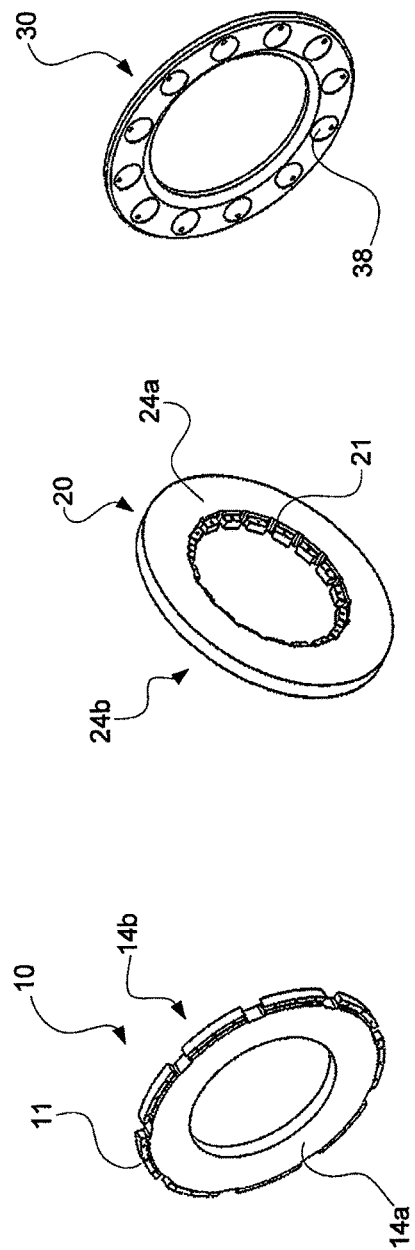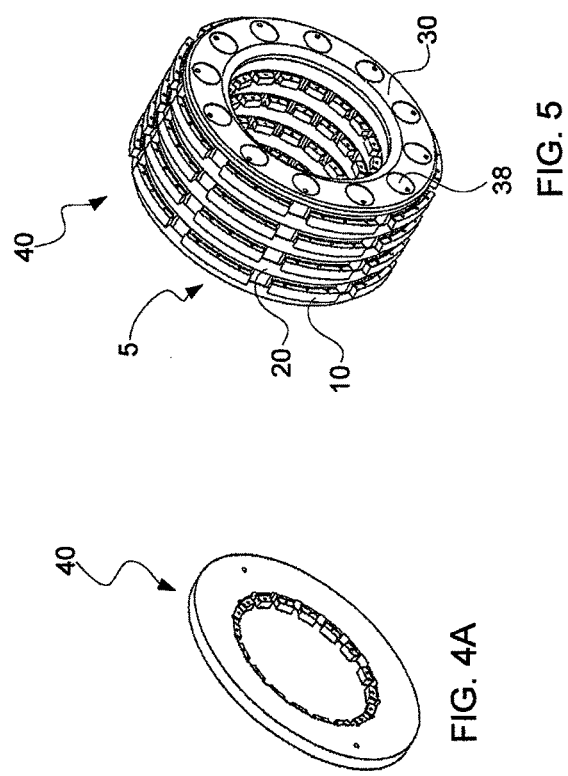

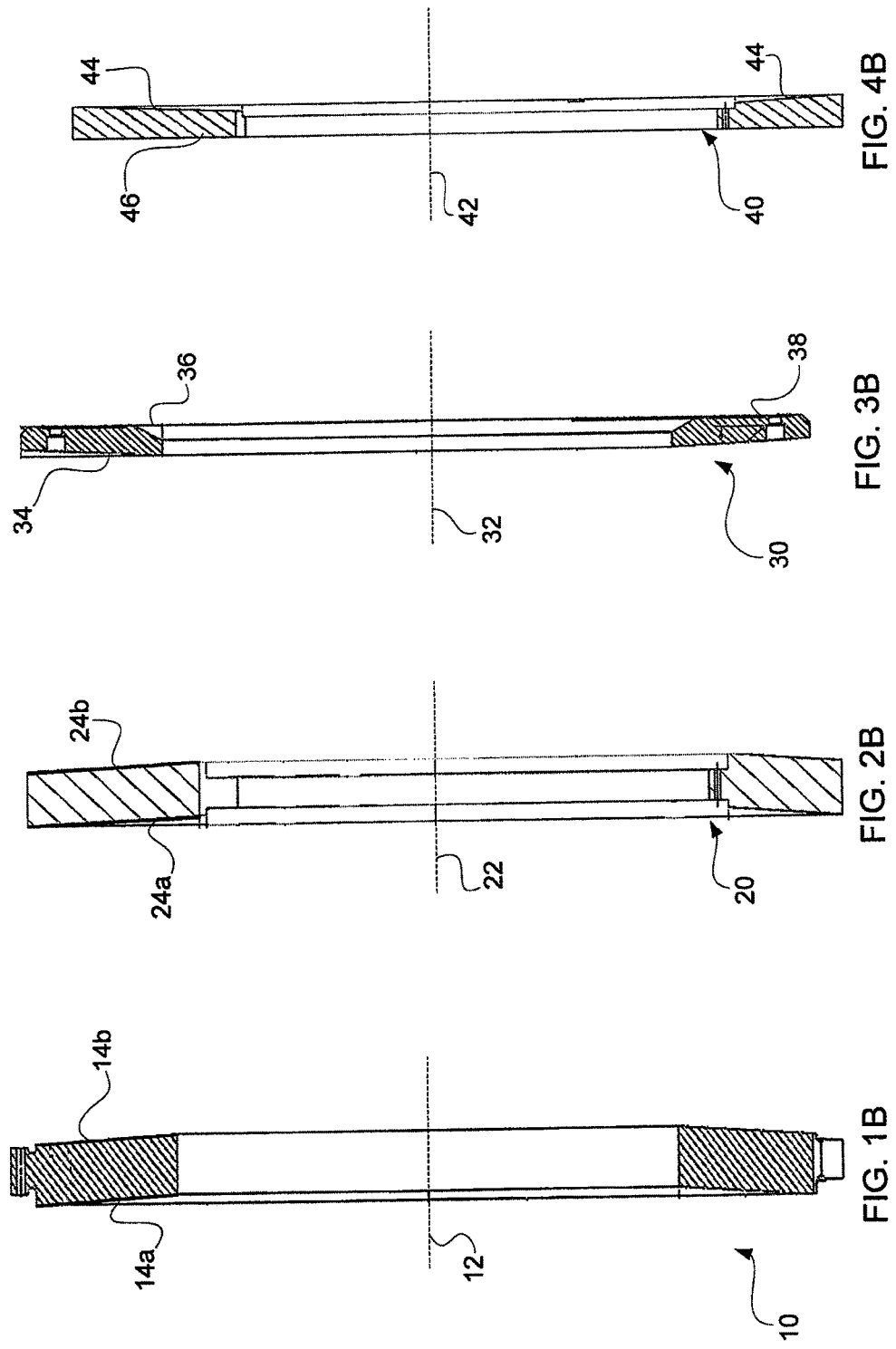

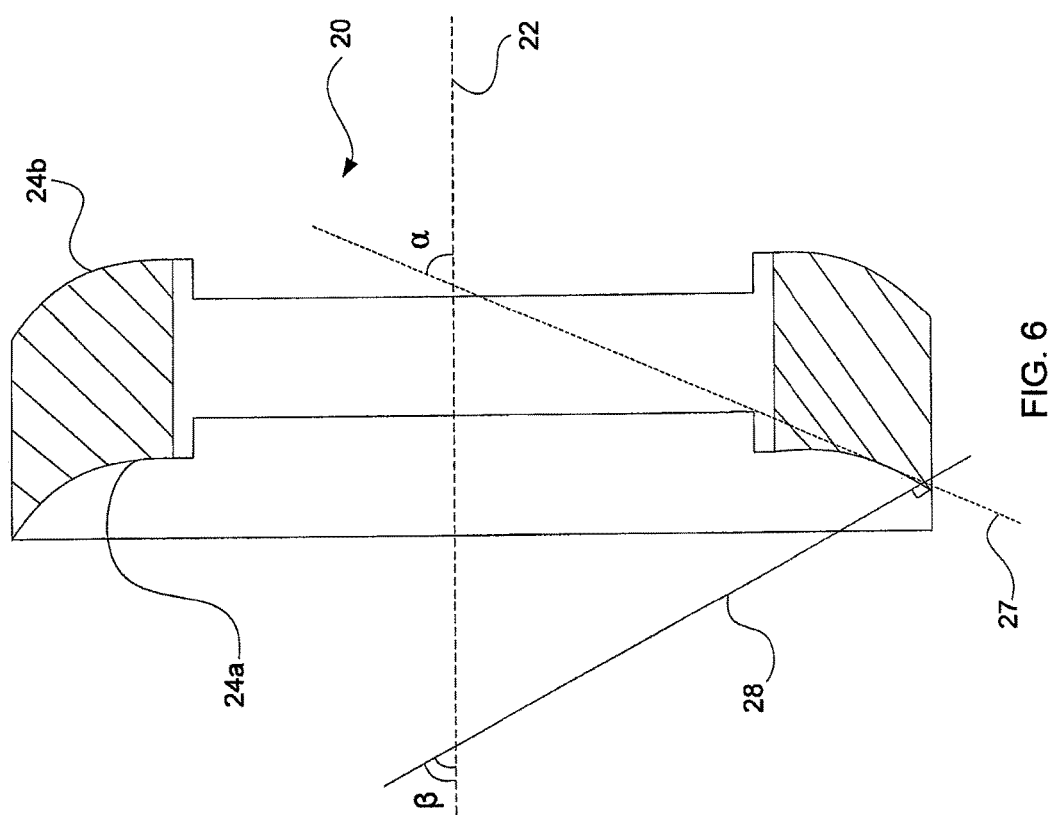

TAPERED BRAKE DISK

FIELD OF INVENTION

This invention generally relates to a tapered brake disk, and more particularly, to rotors and stators having friction surfaces configured to cause the rotors and stators to remain substantially on center during braking.

BACKGROUND OF THE INVENTION

Aircraft wheel and brake systems generally include a non-rotatable wheel support, a wheel rotatably mounted to the wheel support, and a brake heat sink (or brake stack) having alternating brake disks (e.g., rotors and stators) mounted with respect to the wheel support and wheel for axial movement with respect to the wheel. In general, each rotor disk is coupled to the wheel for rotation with the wheel about a wheel rotation axis, and each stator disk is coupled to the wheel support in a non-rotatable manner. An end plate is located at one end of the brake stack, and a pressure plate is located at an opposite end of the brake stack. The rotors and stators are interleaved between the end plate and the pressure plate such that no two rotors and no two stators are adjacent to each other. An actuator ram is configured to apply pressure to the pressure plate, thereby compressing the brake stack to cause the brake disks to frictionally engage, to effectuate braking of the wheel.

The brake disks are generally annular in shape, with a thickness in the axial direction and a diameter in the radial direction, with respect to the axis about which the wheel rotates. An axle is configured to pass through an annular opening in the brake disks. The brake disks each have two friction surfaces: one facing axially toward the end plate and one facing axially toward the pressure plate. A line normal to each of the friction surfaces is substantially parallel to the axis about which the wheel rotates, such that a plane within which each brake disk lies is substantially orthogonal to the axis about which the wheel rotates.

In existing brake stacks, as the actuator applies pressure to the pressure plate and compresses the brake stack, the frictional forces between the brake disks may induce unwanted vibration in the brake system. For example, vibration levels in the brake housing, the axle, and the brake rod may reach undesirable levels during braking. Because the friction surfaces of the brake disks are substantially parallel to each other, vibration due to disk runout may occur, such as whirl vibration and rotor cycloidal vibration. In some existing hydraulic brake systems, orifices are used to facilitate damping of whirl vibration. In addition to increasing the weight of the brake system, the orifices add hydraulic response delay in antiskid modulation, increasing the required response time.

Additionally, in existing brake systems, as the actuator applies pressure to the break stack, the brake disks may move laterally and thereby cause uneven wear patterns on the brake disks. Attempts have been made to reduce this uneven wear by machining wear grooves into the brake disks during manufacture, but this extra production requirement increases cost because of the extra machining. The extra production also reduces the available wear area of the brake.

Generally, existing end plates are coned or tapered away from the brake stack and pucks may be used to reach back towards the brake stack to contact the brake disk neighboring the end plate. This configuration reduces the space available for the brake disks and adds weight due to the length of the pucks.

Accordingly, a brake stack with reduced vibration during a braking operation is desirable, and rotors and stators configured to remain substantially on center during braking are also desirable. Further, it is desirable to reduce weight and uneven brake wear and to increase anti-skid response time in braking systems.

SUMMARY OF THE INVENTION

In an embodiment, a brake stack comprises a stator having an annular, inner periphery section disposed substantially along a first radial plane extending normal to an axis of a wheel, and a stator side wall having a first stator contact surface, the first stator contact surface including a sloped portion which deviates away from the radial plane defined by the annular, inner periphery section. The brake stack further comprises a rotor having an annular, outer periphery section disposed substantially along a second radial plane extending normal to the axis of the wheel, and a rotor side wall having a first rotor contact surface shaped complementary to the first stator contact surface, wherein the stator and the rotor are interleaved.

Further, in accordance with an embodiment, a brake disk may be described as having a first radius of a friction surface at a first axial position, and a second radius of the friction surface at a second axial position, where the first radius is different than the second radius. The brake disk may be a frusto-ellipsical and/or a frusto-conical brake disk. The brake disk has an axis of rotation orthogonal to a plane of rotation, where the brake disk rotates substantially in the plane of rotation, and the friction surface is at an acute angle to the plane of rotation. The brake disk may further have an axis of rotation, where a line tangent to the friction surface intersects the axis of rotation at an angle other than 90 degrees. Further, the brake disk may not include wear grooves.

According to various embodiments, an aircraft brake system comprises an aircraft rotor oriented orthogonally with respect to an axis of rotation, and an aircraft stator that nests with the aircraft rotor, where a stator friction surface is non-orthogonal to the axis of rotation. The aircraft rotor includes a rotor friction surface that is non-orthogonal to the axis of rotation, and the rotor friction surface nests with the stator friction surface to facilitate maintaining the aircraft rotor and aircraft stator substantially on center during a braking operation. An actuator may be utilized to compress the brake stack, and a rotor and a stator in the brake stack remain substantially on center in response to the actuator compressing the brake stack.

BRIEF DESCRIPTION OF THE DRAWINGS

The system and/or method may be better understood with reference to the following drawing figures and description. Non-limiting and non-exhaustive descriptions are described with reference to the following drawing figures. The components in the figures are not necessarily to scale, emphasis instead being placed upon illustrating principles. In the figures, like referenced numerals may refer to like parts throughout the different figures unless otherwise specified.

FIG. 1A illustrates a perspective view of a rotor according to an embodiment;

FIG. 1B illustrates a sectional view of a rotor according to an embodiment;

FIG. 2A illustrates a perspective view of a stator according to an embodiment;

FIG. 2B illustrates a sectional view of a stator according to an embodiment;

FIG. 3A illustrates a perspective view of an end plate according to an embodiment;

FIG. 3B illustrates a sectional view of an end plate according to an embodiment;

FIG. 4A illustrates a perspective view of a pressure plate according to an embodiment;

FIG. 4B illustrates a sectional view of a pressure plate according to an embodiment;

FIG. 5 illustrates a perspective view of a brake stack according to an embodiment;

FIG. 6 illustrates a sectional view of a frusto-ellipsical stator according to an embodiment;

DETAILED DESCRIPTION

Figure 7:
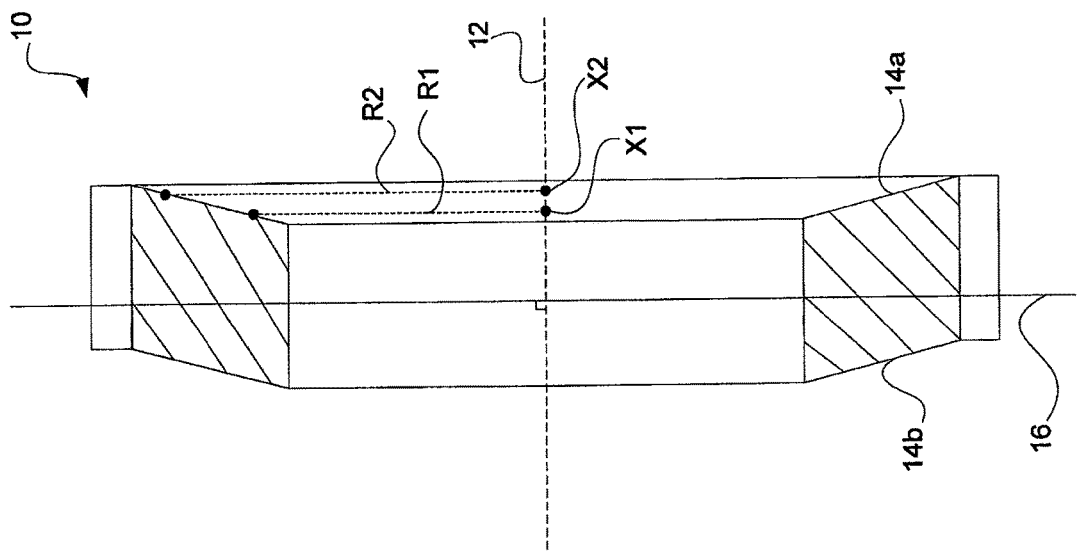
FIG. 7 illustrates a sectional view of a frusto-conical rotor according to an embodiment.

The detailed description of various embodiments herein makes reference to the accompanying drawing figures, which show various embodiments and implementations thereof by way of illustration and its best mode, and not of limitation. While these embodiments are described in sufficient detail to enable those skilled in the art to practice the embodiments, it should be understood that other embodiments may be realized and that mechanical and other changes may be made without departing from the spirit and scope of the invention. Furthermore, any reference to singular includes plural embodiments, and any reference to more than one component may include a singular embodiment.

Also, any reference to attached, fixed, connected or the like may include permanent, removable, temporary, partial, full and/or any other possible attachment option. Additionally, any reference to without contact (or similar phrases) may also include reduced contact or minimal contact. Finally, though the various embodiments discussed herein may be carried out in the context of an aircraft, it should be understood that systems and methods disclosed herein may be incorporated into anything needing a brake or having a wheel, or into any vehicle such as, for example, an aircraft, a train, a bus, an automobile and the like.

The various embodiments of the brake disk and brake stack comprise the features hereinafter described and particularly pointed out in the claims. The following description and the annexed drawings set forth in detail certain illustrative embodiments of the disclosure. These embodiments are indicative, however, of but a few of the various ways in which the principles disclosed herein may be employed. Other objects, advantages and novel features will become apparent from the following detailed description when considered in conjunction with the drawings.

Various embodiments relate to a brake stack or heat sink having rotors and stators interleaved between an end plate and a pressure plate. The rotors are configured to rotate with a wheel about an axle, and the stators and the pressure plate are configured to remain stationary with respect to the axle. To effectuate braking, pressure is applied by an actuator against the pressure plate, thereby compressing the rotors and stators within the brake stack against the end plate causing frictional surfaces on the pressure plate, end plate, rotors and stators to engage.

To reduce or minimize vibration during braking, various geometries of the brake disks may be utilized to facilitate keeping the brake disks on center during the braking operation. For example, the rotors and the wheel rotate about an axis of rotation that passes substantially through the center of the axle, rotors, stators, back plate and pressure plate. Vibration due to runout, such as whirl vibration and/or rotor cycloidal vibration, may be minimized or reduced during braking by keeping the axis of rotation substantially through the center of the brake disks. Keeping the brake disks centered by maintaining the axis of rotation substantially through the center of the brake disks (i.e., collinear with the axial centerline of the brake disks) further facilitates reducing uneven brake wear that may result from the brake disks shifting off-center during braking.

In accordance with various embodiments, surfaces on the brake disks may be angled, tapered, curved, sloped, and the like to facilitate the brake disks nesting with, within and/or into each other to keep the brake disks centered. For example, a brake disk may be shaped in a fashion similar to a Belleville washer, or a cupped-spring washer, that has a frusto-conical shape. With neighboring brake disks shaped in this manner and interleaved in a mating fashion, the tapered faces of the disks facilitate maintaining the brake disks substantially on center.

It should be understood that many configurations and geometries of brake disks may facilitate keeping the brake disks substantially on center during a braking operation, and all such configurations are contemplated within the scope of the present disclosure. For example, brake disk geometries may include a frustum of various three dimensional shapes, such as spheres, ellipsoids, and paraboloids. Brake disks having a geometry configured to facilitate maintaining the nested brake disks on center, including a geometry of any section of any three dimensional shape, are contemplated within the scope of the present disclosure. In the specification and the claims, although the brake disk geometry may be described or claimed with respect to a particular geometry, such as "frusto-ellipsical," this terminology is not limited to describing or claiming a frustum of an ellipsoid or any other particular geometry unless otherwise indicated. Rather, for simplicity, a single term may be used to refer to any geometry of a brake disk that facilitates nesting of the brake disks and maintaining the brake disks substantially on center with respect to neighboring brake disks and/or with respect to the axis of rotation of the rotors.

In accordance with various embodiments, the geometry of brake disks disclosed herein may be described with respect to sectional views of the brake disks (e.g., FIGS. 1A-4B). These sectional views facilitate discussion of the disclosed embodiments, but is should be understood that the sectional views relate to the represented three dimensional brake disks.

According to an embodiment, and with reference to FIGS. 1A and 1B, a rotor 10 is generally annular in shape, and includes friction surfaces 14a, 14b, a centerline 12, and a plurality of spline or drive keys 11 that facilitate splining rotor 10 to the wheel. As illustrated in FIGS. 1A and 1B, rotor 10 is frusto-conical in shape, with sectional views friction surfaces 14a, 14b being tapered such that centerline 12 is non-orthogonal with respect to friction surfaces 14a, 14b.

In an embodiment as illustrated in FIGS. 2A and 2B, a stator 20 is also generally annular in shape, and includes friction surfaces 24a, 24b, a centerline 22, and a plurality of spine or drive keys 21 that facilitate splining the stator 20 to a torque tube or other element configured to prevent stator 20 from rotating with respect to the wheel axle. As illustrated in FIGS. 2A and 2B, stator 20 is also frusto-conical in shape, with sectional views friction surfaces 24a, 24b being tapered such that centerline 22 is non-orthogonal with respect to friction surfaces 24a, 24b. The splined connections in the stator and/or rotor may be effected by a plurality of spine or drive keys that are spaced around the circumference of the wheel rim/torque tube to permit axial movement of the rotor/stator disks while preventing the stator from rotating but permitting the rotor to rotate with respect to the axle. In accordance with various embodiments, rotor 10 and stator 20 may be configured to nest with, within and/or into each other to facilitate maintaining centerlines 12, 22 collinear with the axis of rotation of rotor 10—that is, to maintain rotor 10 and stator 20 on center during a braking operation. For example, with reference to FIG. 5, rotors 10 and stators 20 are interleaved such that rotors 10 and stators 20 alternate within brake stack 5. In such a configuration, rotor 10 friction surface 14b is configured to interface with stator 20 friction surface 24a in a manner that advantageously reduces vibration and uneven wear due to lateral movement of the brake disks. Additionally, the tapered brake disks may be configured to have a belleville spring effect when they nest, thereby cushioning the braking force as the disks deflect.

According to an embodiment, and with reference to FIGS. 3A and 3B, an end plate 30 is generally annular in shape and includes a friction surface 34 configured to interface with a friction surface 14a of rotor 10 or friction surface 24a of stator 20. For example, friction surface 34 may be tapered to the same degree as friction surface 14a, 14b, 24a, or 24b such that frictional forces develop between end plate 30 and rotor 10 or stator 20 during a braking operation. End plate 30 may further comprise puck receiving portions 38 configured to receive circumferentially spaced torque pucks (not shown). In a configuration where the angle of the brake discs is outboard, then the distance between the end plate 30 and the end rotor 10 may be shorter than in existing brake stacks, and the torque pucks may be shorter than those used in brake stacks with non-tapered friction surfaces on the brake disks.

With reference to FIGS. 4A and 4B, a pressure plate 40 according to an embodiment is generally annular in shape and includes a friction surface 44 configured to interface with a friction surface 14a of rotor 10 or friction surface 24a of stator 20. For example, friction surface 44 may be tapered to the same degree as friction surface 14a, 14b, 24a, or 24b such that frictional forces develop between pressure plate 40 and rotor 10 or stator 20 during a braking operation. Pressure plate 40 further includes an actuator surface 46 configured to receive a braking actuator that exerts a force on pressure plate 40 to effectuate compressing rotors 10 and stators 20 to facilitate braking of the wheel. While it should be understood that rotors 10 and stators 20 are interleaved between pressure plate 40 and end plate 30, either a rotor 10 or stator 20 may be adjacent end plate 30 or pressure plate 40, and the same type of brake disk may be adjacent both end plate 30 and pressure plate 40 in an embodiment.

According to various embodiments, the brake disks disclosed herein may be advantageously configured to have friction surfaces at a predetermined angle with respect to the plane of rotation of the brake disks. For example, with reference again to FIG. 1B, rotor 10 may be configured to rotate within a plane of rotation that is orthogonal to centerline 12. Friction surfaces 14a, 14b of rotor 10 are configured to be tapered at a predetermined angle with respect to the plane of rotation of rotor 10. For example, the predetermined angle may be offset within a range of about one to about ten degrees from the plane of rotation, and in an embodiment, the predetermined angle may be three degrees. Further, in an embodiment, the predetermined angle may be any angle such that the friction surface of the brake disk is not substantially parallel to the plane of rotation.

In various embodiments, rotor 10, stator 20, end plate 30 and pressure plate 40 may be configured to have friction surfaces with a profile of any geometric shape configured to facilitate nesting of the disks within the brake stack. For example, and with reference to FIG. 6, friction surfaces 24a, 24b of stator 20 may be configured to be ellipsoidal in nature such that stator 20 is frusto-ellipsical. The friction surfaces of the remaining components of the brake stack may similarly be frusto-ellipsical to facilitate nesting of the brake stack in a manner that reduces vibration and wear by restricting lateral movement of the brake stack components. In accordance with various embodiments, the friction surfaces of the various brake stack components may have any geometry configured to facilitate nesting of the brake stack components and maintaining the centerlines of the components collinear with the axis of rotation of the rotors, and different components within the brake stack may have different profiles. For example, friction surface 14a may be configured to be substantially parallel to friction surface 14b. In an embodiment, friction surface 14a has a frusto-conical profile and friction surface 14b has a different profile, for example, a curved profile.

Further, in accordance with an embodiment, a brake stack comprises a stator having an annular, inner periphery section disposed substantially along a first radial plane extending normal to an axis of a wheel, and a stator side wall having a first stator contact surface, the first stator contact surface including a sloped portion which deviates away from the radial plane defined by the annular, inner periphery section. The brake stack also comprises a rotor having an annular, outer periphery section disposed substantially along a second radial plane extending normal to the axis of the wheel, and a rotor side wall having a first rotor contact surface shaped complementary to the first stator contact surface, wherein the stator and the rotor are interleaved.

It should be understood that various geometrical terms may be utilized to describe the nesting brake disks disclosed herein. For example, FIG. 6 illustrates a cross section of a frusto-ellipsical stator 20. Friction surface 24a of stator 20 is illustrated has having a line that is tangent (tangent 27) to friction surface 24a. It should be understood that infinite lines tangent to friction surface 24a may be constructed, but only one is illustrated here for simplicity. Tangent 27 intersects centerline 22 at an angle $\alpha$. As illustrated, angle $\alpha$ is not equal to ninety degrees. It should be understood that tangent 27 also intersects the axis about which rotor 10 and the wheel rotate at angle $\alpha$ because centerline 22 is configured to be collinear with the axis of rotation as discussed. In accordance with various embodiments, sectional views of brake disks as disclosed herein include at least one line tangent to the friction surface (i.e., wear surface) that intersects centerline 22 and/or the wheel axis of rotation at an angle other than ninety degrees. It should be understood that lines tangent to wear surfaces of a non-tapered stator would intersect the non-tapered stator centerline at substantially ninety degrees, and therefore, stators as disclosed herein have lines tangent to the friction surfaces that are not substantially ninety degrees. It should further be understood that wear grooves in existing brake disks are not considered to be part of the wear surface for purposes of constructing the line tangent to the wear surface. Rotor 10 according to various embodiments also includes a line tangent to friction surfaces 14a, 14b that intersects centerline 12 at an angle other than ninety degrees.

With continued reference to FIG. 6, a line normal 28 to friction surface 24a may be constructed. As with tangent 27, infinite lines normal to friction surface 24a exist, but only one is illustrated in this sectional view of stator 20. Line normal 28 intersects centerline 22 and the axis of rotation of the rotors at an angle β. Friction surfaces 24a, 24b of stator 20 contain at least one line normal to the friction surfaces that intersects centerline 22 and/or the axis of rotation of the wheel/rotors. It should be understood that for a non-tapered stator, all lines normal to the friction surfaces (i.e., wear surfaces) would be substantially parallel to the centerline of the non-tapered stator, and stators according to various embodiments disclosed herein therefore have at least one line normal to the friction surface that is not substantially parallel to the centerline of the stator. It should further be understood that wear grooves in existing brake disks are not considered to be part of the wear surface for purposes of constructing the line normal to the wear surface. Rotor 10 according to various embodiments also includes a line normal to friction surfaces 14a, 14b that intersects centerline 12 and/or is not substantially parallel to centerline 12.

Furthermore, a geometry of a rotor 10 according to an embodiment may be described with reference to FIG. 7. At a position X1 along centerline 12, a radius R1 of friction surface 14a exists. That is, a circle projected on a plane that intersects rotor 10 at position X1 would have a radius R1 or a diameter of two times R1. Or, in other words, a sectional view of friction surface 14a of rotor 10 illustrates a radius R1 at a position X1 along centerline 12. At a second position X2 along centerline 12, a second radius R2 of friction surface 14a exits. To facilitate the nesting of rotor 10 with stator 20, R1 is advantageously different than R2. In an embodiment as illustrated in FIG. 7, R1 is advantageously less than R2. It should be understood that R2 may increase or decrease linearly, non-linearly, exponentially, logarithmically, parabolically, quadratically, or in any fashion with a change in position along centerline 12, where X2 and R2 are advantageously determined to facilitate nesting of rotor 10 with stator 20 during a braking operation.

With continued reference to FIG. 7, discussion of the tapered brake disks and brake stacks into which they may be incorporated may be facilitated by discussing a plane of rotation of the rotors. For example, rotor 10 may be configured to rotate within a plane of rotation 16. Plane of rotation 16 is configured to be orthogonal to centerline 12 and the axis about which rotor 10 is configured to rotate. As illustrated in FIG. 7, a sectional view of friction surfaces 14a, 14b may be described as being non-orthogonal with respect to centerline 12. Similarly, stator 20 friction surfaces 24a, 24b, pressure plate 40 friction surface 44 and/or end plate 30 friction surface 34 may be described as being non-orthogonal with respect to the centerlines of the respective brake stack elements and/or to the axis of rotation of the wheel.

Various embodiments are configured to provide advantages over existing brake stacks or heat sinks. For example, tapered brake disks as disclosed herein are configured to reduce and/or eliminate certain types of vibration, such as rotor cycloidal vibration and whirl vibration. Also, brake stacks as disclosed herein may be lighter due in part to the elimination of orifices used in hydraulic brake systems for damping of whirl vibration. This elimination of orifices may also reduce and/or eliminate hydraulic response delay during antiskid modulation, thereby improving system response. Additionally, elimination of wear grooves in the brake disks means that more radial space may be used for carbon to increase the available wear area of the brake disk.

Figure 8:
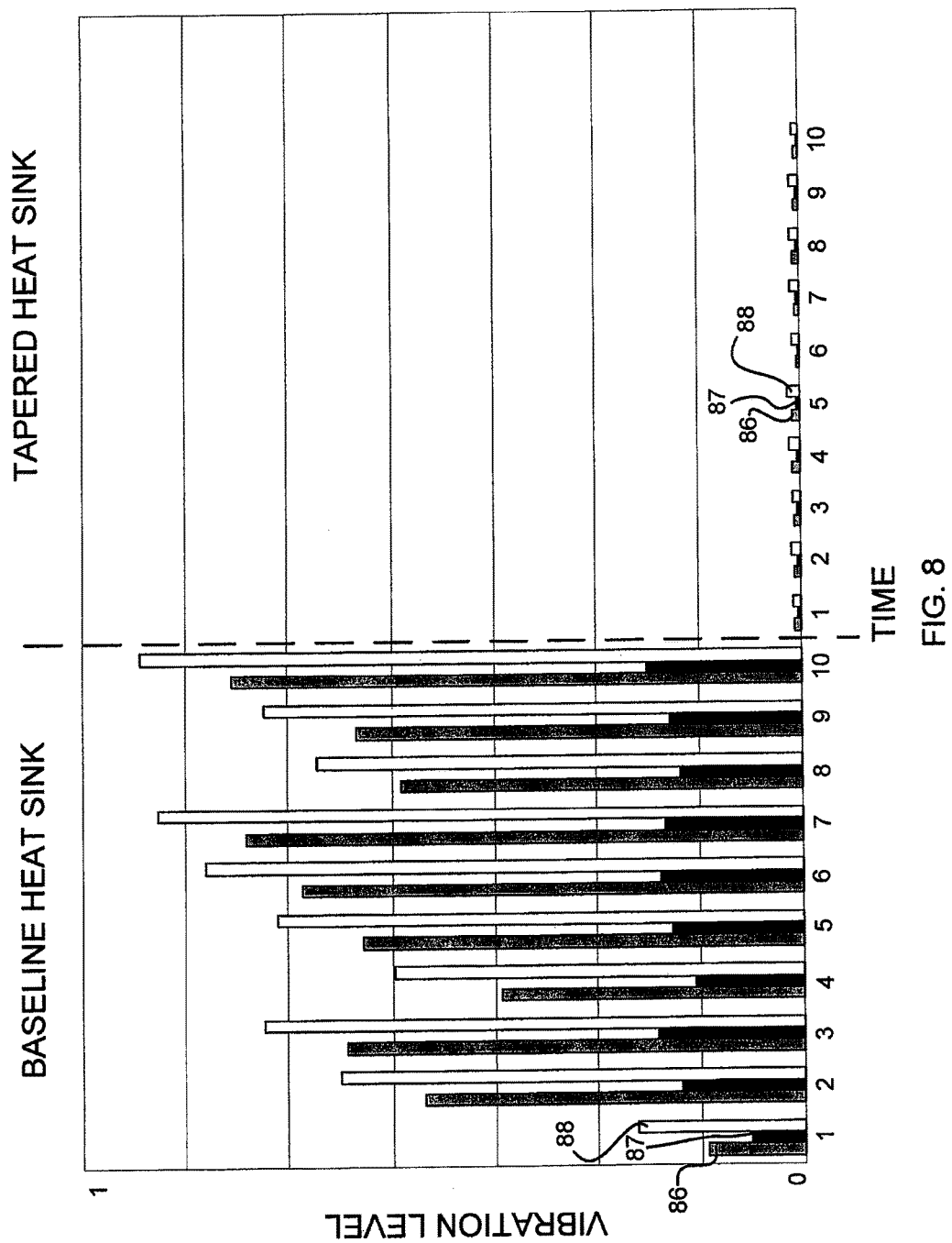
FIG. 8 illustrates a representation of test results for a baseline heat sink and a tapered heat sink according to an embodiment.

With reference to FIG. 8, certain test results are illustrated that show reduction in vibration levels between existing brake stacks or heat sinks, and brake stacks or heat sinks as disclosed herein. For example, FIG. 8 illustrates vibration levels in a piston housing 86, an axle 87, and a brake rod 88 for both an existing "baseline heat sink" and a "tapered heat sink" according to an embodiment of the present disclosure. The vertical axis illustrates a normalized magnitude of measured vibration, while the horizontal axis represents certain test conditions representative of a braking operation for the two different heat sinks. It should be understood that FIG. 8 is not necessarily to scale and only represents relative values of measured vibration at different times during a braking operation. As seen in FIG. 8, heat sinks according to various embodiments disclosed herein substantially reduce vibration compared with currently existing heat sinks.

Although the invention has been shown and described with respect to certain embodiments, equivalents and modifications will occur to others who are skilled in the art upon reading and understanding of the specification. Various embodiments include all such equivalents and modifications, and are limited only by the scope of the following claims.

Additionally, benefits, other advantages, and solutions to problems have been described herein with regard to various embodiments. However, the benefits, advantages, solutions to problems, and any elements that may cause any benefit, advantage, or solution to occur or become more pronounced are not to be construed as critical, required, or essential features or elements of the invention. The scope of the invention is accordingly to be limited by nothing other than the appended claims, in which reference to an element in the singular is not intended to mean "one and only one" unless explicitly so stated, but rather "one or more." Moreover, where a phrase similar to "at least one of: A, B, and C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

The invention claimed is:
1. An aircraft brake stack, comprising:
a stator having an annular, inner periphery section disposed substantially along a first radial plane extending normal to an axis of a wheel, and a stator side wall having a first stator contact surface, the first stator contact surface including a sloped portion which devi- ates away from the radial plane defined by the annular, inner periphery section; and a rotor having an annular, outer periphery section disposed substantially along a second radial plane extending normal to the axis of the wheel, and a rotor side wall having a first rotor contact surface shaped complementary to the first stator contact surface, wherein the stator and the rotor are interleaved.

2. The aircraft brake stack of claim 1, wherein the stator further comprises a frusto-conical profile.

3. The aircraft brake stack of claim 1, wherein the rotor comprises an axis of rotation.

4. The aircraft brake stack of claim 3, wherein the axis of rotation is substantially collinear with the axis of the wheel in response to a braking force exerted on the brake stack.

5. The aircraft brake stack of claim 4, wherein a pressure plate comprises a pressure plate contact surface and an end plate comprises an end plate contact surface, wherein the pressure plate contact surface and the end plate contact surface are shaped complementary to at least one of a second stator contact surface and a second rotor contact surface, wherein the end plate contact surface and the pressure plate contact surface comprise frusto-ellipsical contact surfaces, wherein the frusto-ellipsical contact surfaces comprise a frustum of at least one of a sphere, ellipsoid and paraboloid.

6. The aircraft brake disk of claim 1, wherein an entirety of the first stator contact surface is in contact with an entirety of the first rotor contact surface.

* * * * *